US010523835B2

(12) United States Patent
Nojiri et al.

(10) Patent No.: US 10,523,835 B2
(45) Date of Patent: Dec. 31, 2019

(54) IMAGE-READING APPARATUS FOR CONTINUOUSLY PERFORMING READING PROCESS ON FIRST SET OF DOCUMENTS AND READING PROCESS ON SECOND SET OF DOCUMENTS

(71) Applicant: BROTHER KOGYO KABUSHIKI KAISHA, Nagoya, Aichi (JP)

(72) Inventors: Hiroya Nojiri, Nagoya (JP); Kenju Narita, Nagoya (JP); Kenji Tamaki, Ichinomiya (JP); Lei Li, Ichinomiya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/243,457

(22) Filed: Jan. 9, 2019

(65) Prior Publication Data
US 2019/0222707 A1 Jul. 18, 2019

(30) Foreign Application Priority Data
Jan. 15, 2018 (JP) .................................. 2018-004035

(51) Int. Cl.
*G06F 15/00* (2006.01)
*G06K 1/00* (2006.01)
(Continued)

(52) U.S. Cl.
CPC ..... *H04N 1/00933* (2013.01); *H04N 1/00241* (2013.01); *H04N 1/00917* (2013.01); *H04N 1/00925* (2013.01)

(58) Field of Classification Search
CPC .......... H04N 1/00933; H04N 1/00241; H04N 1/00917; H04N 1/00925
(Continued)

(56) References Cited

U.S. PATENT DOCUMENTS

2010/0188698 A1\* 7/2010 Koizumi ............ G03G 15/5004
358/1.15
2010/0245879 A1   9/2010 Tsuya
(Continued)

FOREIGN PATENT DOCUMENTS

JP    2010-259061 A    11/2010
JP    2016-143969 A     8/2016

*Primary Examiner* — Douglas Q Tran
(74) *Attorney, Agent, or Firm* — Scully, Scott, Murphy & Presser, PC

(57) ABSTRACT

An image-reading apparatus includes an image-reader and a controller. The controller is configured to perform: controlling the image-reader to execute: (a1) reading a first set of original documents; and (a2) generating read data sets indicating images on the original documents in the first set; transmitting the read data sets generated by the (a2) generating to an information-processing apparatus; counting a remaining period until a specific time, the specific time being a time when a first period elapses from a predetermined time after completing the (a2) reading; transmitting the counted remaining period to the information-processing apparatus; controlling, in response to receiving a specific signal before the specific time, the image-reader to execute: (e1) reading a second set of original documents; and (e2) generating read data sets indicating images on the original documents in the second set; and transmitting the read data sets generated by the (e2) generating to the information-processing apparatus.

12 Claims, 8 Drawing Sheets

(51) Int. Cl.
*G06K 15/00* (2006.01)
*H04N 1/00* (2006.01)

(58) Field of Classification Search
USPC .............................. 358/1.14, 1.15, 1.13, 1.1
See application file for complete search history.

(56) References Cited

U.S. PATENT DOCUMENTS

| | | | | |
|---|---|---|---|---|
| 2011/0188061 | A1* | 8/2011 | Miyamoto | G06K 15/16 358/1.12 |
| 2012/0268765 | A1* | 10/2012 | Yamade | G06F 17/5004 358/1.13 |
| 2016/0227062 | A1 | 8/2016 | Miyazaki et al. | |

* cited by examiner

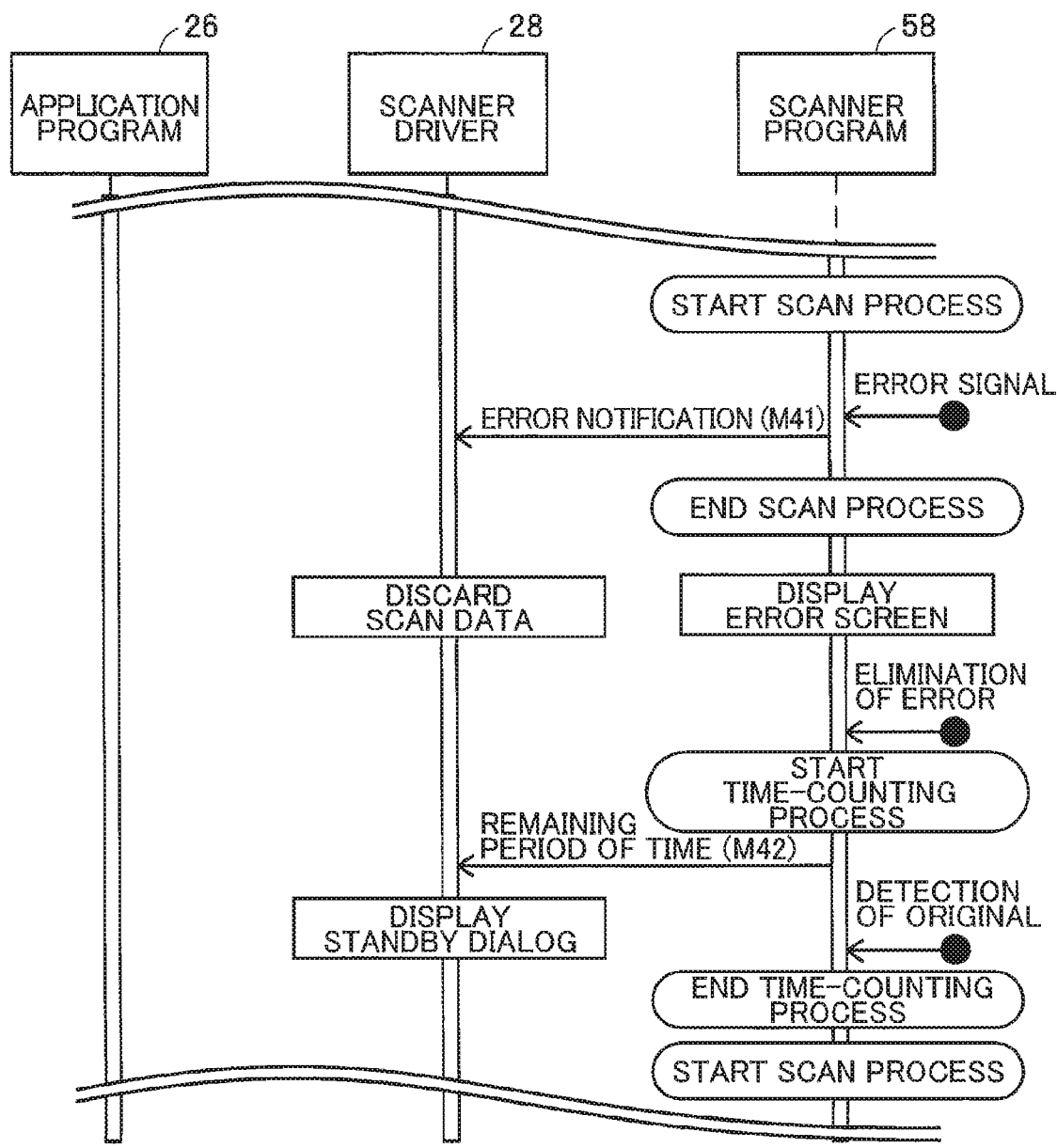

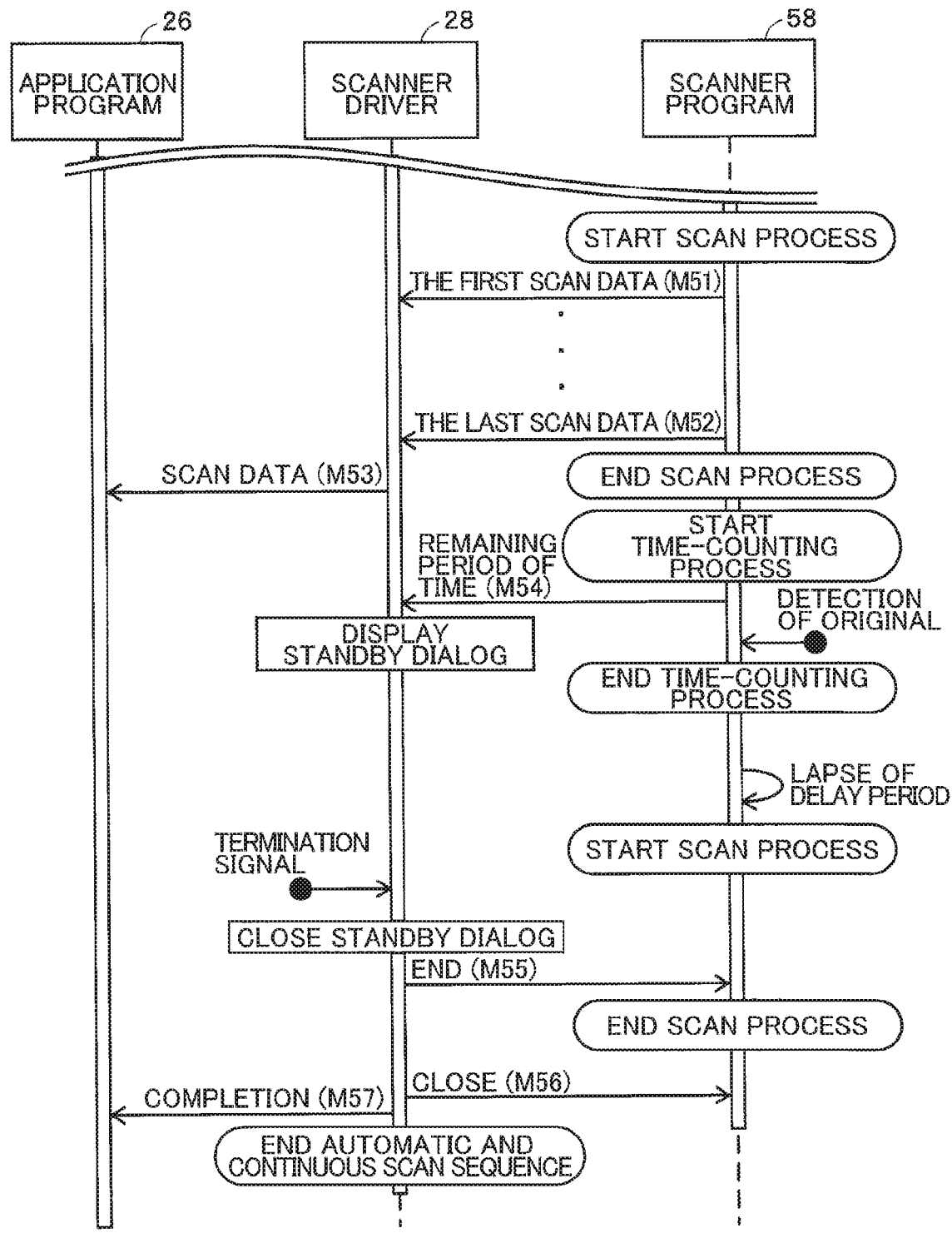

IMAGE-READING APPARATUS FOR CONTINUOUSLY PERFORMING READING PROCESS ON FIRST SET OF DOCUMENTS AND READING PROCESS ON SECOND SET OF DOCUMENTS

CROSS REFERENCE TO RELATED APPLICATION

This application claims priority from Japanese Patent Application No. 2018-004035 filed Jan. 15, 2018. The entire content of the priority application is incorporated herein by reference.

TECHNICAL FIELD

The present disclosure relates to an image-reading apparatus, a storage medium storing a set of program instructions for an information-processing apparatus, and a reading system including an image-reading apparatus and an information-processing apparatus.

BACKGROUND

There has been conventionally known an image-reading apparatus configured to perform a reading process of reading an original document and generating a read data set indicating an image on the original document. Further, a conventional technique has been known for enabling to treat, as one group of data, a plurality of read data sets generated through the reading process performed multiple times by the image-reading apparatus.

For example, a conventional technique for a control device capable of communicating with an image-reading apparatus is known. In the control device according to the technique, when a subsequent read data set is transmitted from the image-reading apparatus within a predetermined period of time after a preceding read data set is transmitted, the subsequent read data set is included in the same file that includes the preceding read data set. By this technique, the user can generate a single file by having the image-reading apparatus sequentially read original documents within the predetermined period of time.

SUMMARY

An object of the present disclosure is to provide an alternative solution to the problem which the above conventional technique attempts to solve. In other words, it is an object of the present disclosure is to provide a technique of capable of treating, as one group of data, a plurality of scan data sets generated through a reading process performed multiple times by an image-reading apparatus that has received from a control device an instruction to perform reading.

In order to attain the above and other objects, according to one aspect, the present disclosure provides an image-reading apparatus including: an image-reader; a communication interface; and a controller. The image-reader is configured to read an original document and to generate a read data set indicating an image on the original document. The communication interface enables the image-reading apparatus to communicate with an information-processing apparatus. The controller is configured to perform: (a) controlling, in response to receiving a reading start instruction from the information-processing apparatus via the communication interface, the image-reader to execute: (a1) reading a first set of one or more original documents; and (a2) generating one or more read data sets indicating one or more images on the one or more original documents in the first set; (b) transmitting, to the information-processing apparatus via the communication interface, the one or more read data sets generated by the (a2) generating; (c) counting a remaining period of time until a specific time, the specific time being a time when a first period of time elapses from a predetermined time after completion of the (a2) reading; (d) transmitting, to the information-processing apparatus via the communication interface, information indicating the counted remaining period of time; (e) controlling, in response to receiving a specific signal before the specific time, the image-reader to execute: (e1) reading a second set of one or more original documents; and (e2) generating one or more read data sets indicating one or more images on the one or more original documents in the second set; and (f) transmitting, to the information-processing apparatus via the communication interface, the one or more read data sets generated by the (e2) generating.

According to another aspect, the present disclosure provides a non-transitory computer-readable storage medium storing a set of program instructions for an information-processing apparatus including a communication interface; a display; and a processor. The communication interface enables the information-processing apparatus to communicate with an image-reading apparatus. The set of program instructions, when executed by the processor, causes the information-processing apparatus to perform a reading sequence. The reading sequence includes: (a) transmitting, after starting to perform the reading sequence, a reading start instruction to the image-reading apparatus via the communication interface, the image-reading apparatus being configured to perform, in response to receiving the reading start instruction: (i1) reading a first set of one or more original documents; and (i2) generating one or more read data sets indicating one or more images on the one or more original documents in the first set; (b) receiving, from the image-reading apparatus via the communication interface, the one or more read data sets generated by the (i2) generating; (c) receiving, from the image-reading apparatus via the communication interface, information indicating a remaining period of time until a specific time, the specific time being a time when a specific period of time elapses from a predetermined time after completion of the (i1) reading, the image-reading apparatus being configured to further perform, in response to receiving a specific signal before the specific time: (i3) reading a second set of one or more original documents; and (i4) generating one or more read data sets indicating one or more images on the one or more original documents in the second set; (d) displaying, on the display, the remaining period of time indicated by the information received in the (c) receiving; (e) receiving, from the image-reading apparatus via the communication interface, one or more read data sets generated by the (i4) generating; (f) terminating the reading sequence in response to the specific period of time elapsing from the predetermined time without the information-processing apparatus performing the (e) receiving; and (g) terminating the reading sequence in response to receiving a termination instruction before the specific time.

According to still another aspect, the present disclosure provides a reading system including an image-reading apparatus and an information-processing apparatus. The image-reading apparatus includes: an image-reader; a first communication interface; and a first controller. The image-reader is configured to read an original document and to generate a read data set indicating an image on the original document. The first communication interface enables the image-reading apparatus to communicate with the information-processing apparatus. The first controller is configured to perform: (a) controlling, in response to receiving a reading start instruction from the information-processing apparatus via the first communication interface, the image-reader to execute: (a1) reading a first set of one or more original documents; and (a2) generating one or more read data sets indicating one or more images on the one or more original documents in the first set; (b) transmitting, to the information-processing apparatus via the first communication interface, the one or more read data sets generated by the (a2) generating; (c) counting a remaining period of time until a specific time, the specific time being a time when a specific period of time elapses from a predetermined time after completion of the (a1) reading; (d) transmitting, to the information-processing apparatus via the first communication interface, information indicating the counted remaining period of time; (e) controlling, in response to receiving a specific signal before the specific time, the image-reader to execute: (e1) reading a second set of one or more original documents; and (e2) generating one or more read data sets indicating one or more images on the one or more original documents in the second set; and (f) transmitting, to the information-processing apparatus via the first communication interface, the one or more read data sets generated by the (e2) generating. The information-processing apparatus includes: a display; a second communication interface; and a second controller. The second communication interface enables the information-processing apparatus to communicate with an image-reading apparatus. The second controller is configured to perform a reading sequence. The reading sequence includes: (g) transmitting, after starting to perform the reading sequence, the reading start instruction to the image-reading apparatus via the second communication interface; (h) receiving, from the image-reading apparatus via the second communication interface, the one or more read data sets generated by the (a2) generating; (i) receiving, from the image-reading apparatus via the second communication interface, the information transmitted by the (d) transmitting, (j) displaying, on the display, the remaining period of time indicated by the information received in the (i) receiving; (k) receiving, from the image-reading apparatus via the second communication interface, the one or more read data sets generated by the (e2) generating; (l) terminating the reading sequence in response to the specific period of time elapsing from the predetermined time without the second controller performing the (k) receiving; and (m) terminating the reading sequence in response to receiving a termination instruction before the specific time.

BRIEF DESCRIPTION OF THE DRAWINGS

The particular features and advantages of the embodiment(s) as well as other objects will become apparent from the following description taken in connection with the accompanying drawings, in which:

FIG. 9 is a sequence diagram illustrating the automatic and continuous scan sequence in a case where an error has occurred during the scan process executed by the scanner program of the scanner in the scan system according to the embodiment; and FIG. 10 is a sequence diagram illustrating the automatic and continuous scan sequence in a case where the end button on the standby dialog has been selected during the scan process executed by the scanner in the scan system according to the embodiment.

DETAILED DESCRIPTION

<Configuration of Scan System>

Figure 1:
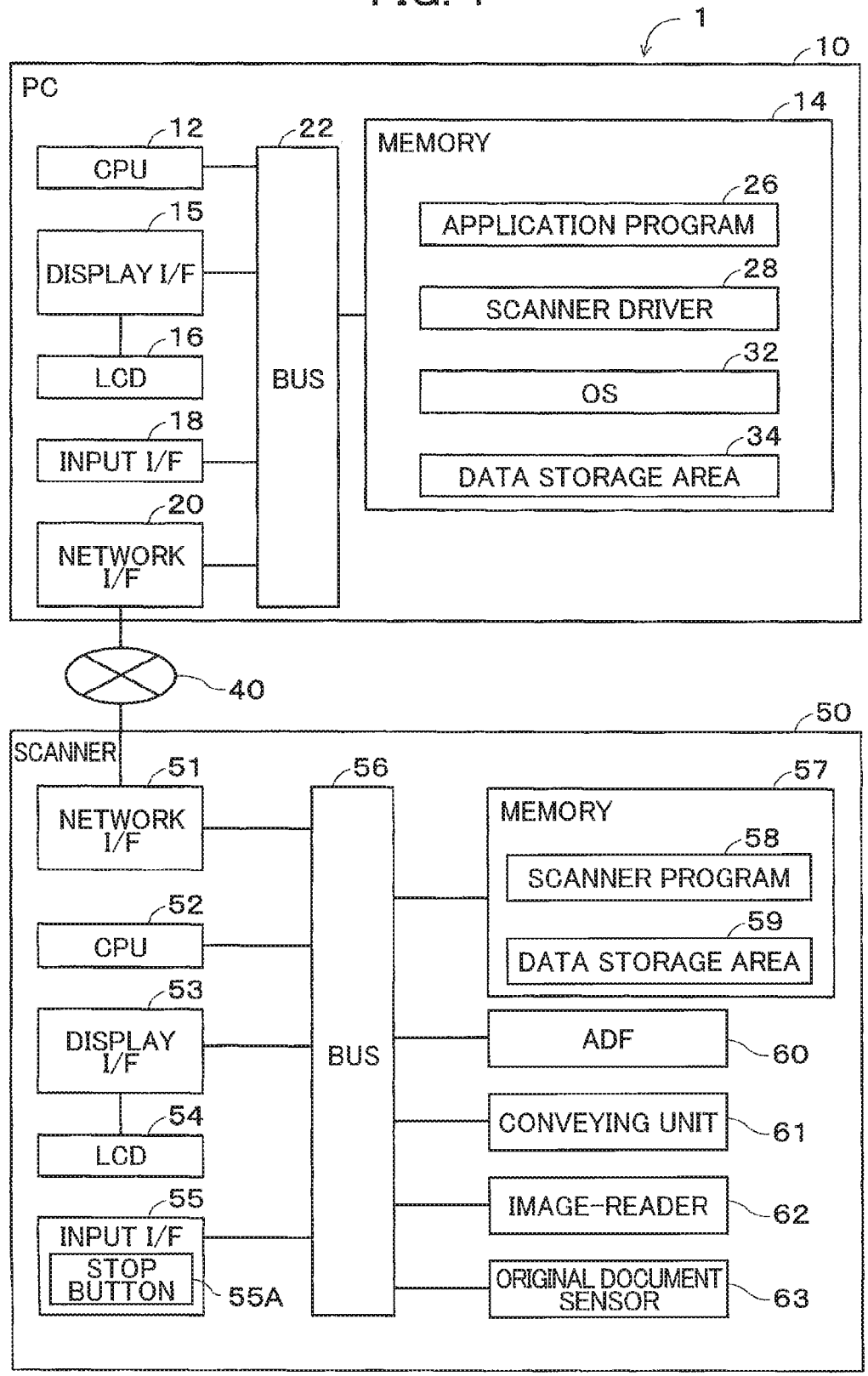
FIG. 1 is a block diagram illustrating a scan system according to an embodiment of the present disclosure.

FIG. 1 is a block diagram illustrating a scan system 1 as an example of a reading system according to an embodiment of the present disclosure. The scan system 1 includes a personal computer 10 (hereinafter, simply referred to as "PC 10") and a scanner 50.

The PC 10 includes a central processing unit 12, a memory 14, a display interface 15, a liquid crystal display 16, an input interface 18, and a network interface 20. These components can communicate with each other via a bus 22. Hereinafter, the central processing unit 12, the display interface 15, the liquid crystal display 16, the input interface 18, and the network interface 20 will be simply referred to as "CPU 12," "display I/F 15," "LCD 16," "input I/F 18," and "network I/F 20," respectively. The PC 10 is an example of the claimed "information-processing apparatus." The network I/F 20 is an example of the claimed "communication interface" and is also an example of the claimed "second communication interface."

The CPU 12 executes processes according to an application program 26, a scanner driver 28, and an operating system 32 (hereinafter, abbreviated as "OS 32"), all of which are stored in the memory 14. For example, the application program 26 is a program for executing, on scan data generated by the scanner 50, an optical character recognition (OCR) process in which a known OCR technique is employed. Specifically, the application program 26 is image editing software, such as Adobe Photoshop (registered trademark). The CPU 12 is an example of the claimed "processor" and is also an example of the claimed "second controller."

The scanner driver 28 is a device driver of the scanner 50 and controls the operations of the scanner 50. The OS 32 is a program that provides basic functions used by the application program 26 and the scanner driver 28. Hereinafter, the CPU 12 executing the application program 26 or another program may also be referred to by the corresponding program name. For example, "the application program 26 executes" may denote "the CPU 12 executing the application program 26 executes." The scanner driver 28 is an example of the claimed "a set of program instructions."

The memory 14 includes a data storage area 34. The data storage area 34 stores data required for the execution of the application program 26 and other programs. The memory 14 is configured of a random access memory (RAM), a read only memory (ROM), a flash memory, a hard disk drive (HDD), a buffer of the CPU 12, or any combination of these, for example. The memory 14 is an example of the claimed "non-transitory computer-readable storage medium."

The memory 14 may be a computer-readable storage medium. The computer-readable storage medium is a non-transitory medium. In addition to the above examples, non-transitory media include a recording medium such as a compact disk read only memory (CD-ROM), a digital versatile disk read only memory (DVD-ROM), and the like. The non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium. This description also applies to a memory 57 (described later) provided in the scanner 50.

The LCD 16 displays various information about the PC 10. The LCD 16 is connected to the bus 22 via the display I/F 15. The LCD 16 acquires display data via the display I/F 15. The input I/F 18 includes a keyboard and a mouse and receives inputs of user operations. The input I/F 18 may include any interface besides a keyboard and a mouse. For example, the input I/F 18 may be a film-like touchscreen laid over the surface of the LCD 16. The network I/F 20 is connected to a network interface 51 of the scanner 50 via a network 40. The LCD 16 is an example of the claimed "display."

The scanner 50 reads an image printed on an original document and generates a scan data set indicating the image. The scanner 50 includes the network interface 51, a central processing unit 52, a display interface 53, a liquid crystal display 54, an input interface 55, the memory 57, an automatic document feeder 60, a conveying unit 61, an image-reader 62, and an original document sensor 63. These components can communicate with each other via a bus 56. Hereinafter, the network interface 51, the central processing unit 52, the display interface 53, the liquid crystal display 54, the input interface 55, and the automatic document feeder 60 will be simply referred to as "network I/F 51," "CPU 52," "display I/F 53," "LCD 54," "input I/F 55," and "ADF 60," respectively. The scanner 50 is an example of the claimed "image-reading apparatus." The network I/F 51 is an example of the claimed "communication interface" and is also an example of the claimed "first communication interface."

The scanner 50 has a casing, an insertion opening, a discharge opening, a conveying path, and a sheet feeding tray (all not illustrated). The insertion opening and the discharge opening are formed at the casing. The conveying path is defined in the interior of the casing and connects the insertion opening and the discharge opening. The sheet feeding tray is disposed at the insertion opening and can support multiple original documents. The casing includes a casing cover capable of opening and closing. In the description below, the term "scan" may be used in the sense of the series of operations performed by the scanner 50 of reading an image printed on an original document and generating scan data indicating the image.

The CPU 52 executes processes according a scanner program 58 stored in the memory 57. The scanner program 58 is a program for comprehensively controlling the scanner 50. The memory 57 is configured of a RAM, a ROM, other media, or any combination of these, for example. The memory 57 includes a data storage area 59. The data storage area 59 stores data required for the execution of the scanner program 58. The CPU 52 is an example of the claimed "controller" and is also an example of the claimed "first controller."

The ADF 60 feeds original documents placed on the sheet feeding tray one by one to the conveying path of the scanner 50. The conveying unit 61 conveys the original documents fed by the ADF 60 to the discharge opening through the conveying path. The image-reader 62 includes a light source and an image scanner and reads an image printed on an original document to generate a scan data set indicating the image. More specifically, the image-reader 62 is configured to read an image printed on an original document line by line and to generate a plurality of pieces of line scan data constituting a scan data set indicating the image on the original document. Note that a piece of line scan data is one line worth of scan data. The image-reader 62 is an example of the claimed "image-reader." Each of the scan data set and the line scan data is an example of the claimed "read data set."

The original document sensor 63 is configured to detect that a set of one or more original documents has been placed on the sheet feeding tray. The original document sensor 63 is further configured to output a detection signal to the CPU 52 in response to detecting that a set of one or more original documents has been placed on the sheet feeding tray. The original document sensor 63 is an example of the claimed "sensor." The detection signal is an example of the claimed "specific signal."

The LCD 54 displays various information about the scanner 50. The LCD 54 is connected to the bus 56 via the display I/F 53. The LCD 54 acquires display data via the display I/F 53. The input I/F 55 includes a stop button 55A and receives user operations. When the stop button 55A is pressed, the input I/F 55 outputs a termination signal to the CPU 52. The input I/F 55 is an example of the claimed "input interface." The termination signal is an example of the claimed "reading termination instruction."

The PC 10 and the scanner 50 can communicate with each other via the network 40. The network 40 may be any network, such as a wired local area network (LAN), a wireless LAN, a wide area network (WAN), a Wi-Fi (registered trademark) network, a Bluetooth (registered trademark) network, and a universal serial bus (USB) cable.

In general, sequence diagrams in this specification depict processes performed by the CPU 52 according to instructions described in the scanner program 58 and other programs. In other words, processes such as "determine," "calculate," "select," "acquire," "receive," "control," and the like in the following description represent processes performed by the CPU 52. Note that, in this specification, the term "acquire" is used under a concept that need not necessarily require a request. That is, a process in which the CPU 52 receives data without issuing a request is included in the concept of "the CPU 52 acquires data." The same holds true for the PC 10, the application program 26, and the scanner driver 28. That is, the sequence diagrams in this specification depict processes performed by the CPU 12 according to instructions described in the application program 26, the scanner driver 28, and other programs.

Further, "data" in this specification is expressed in bit strings that a computer can read. Further, data of different formats are treated as the same data when the content of the data is essentially the same. The same holds true for "information" in this specification.

<Automatic and Continuous Scan Sequence>

An automatic and continuous scan sequence executed by the scanner driver 28 and the scanner program 58 will now be described with reference to FIG. 2. An automatic and continuous scan is a scan function in which the scanner 50 automatically scans a subsequent set of one or more original documents when the subsequent set is additionally placed on the sheet feeding tray before the lapse of a timeout period after completion of scanning a preceding set of one or more original documents placed on the sheet feeding tray. The automatic and continuous scan sequence is an example of the claimed "reading sequence."

According to the above automatic and continuous scan, just by placing the subsequent set of one or more original documents on the sheet feeding tray before the lapse of the timeout period after completion of scanning the preceding set of one or more original documents, the user can have the scanner 50 automatically and continuously scan the subsequent set following the preceding set without user's operations such as an operation via the input I/F 18 of the PC 10. Note that the application program 26 can treat a plurality of scan data sets generated by the automatic and continuous scan as one group of data.

In the following description of the automatic and continuous scan sequence, it will be assumed that the user starts the application program 26 and preliminarily places a set of one or more original documents on the sheet feeding tray of the scanner 50. Note that, hereinafter, the set of one or more original documents preliminarily placed on the sheet feeding tray will be also referred to as "first document set".

When the scanner program 58 in a standby mode receives from the original document sensor 63 a detection signal indicating that the first document set has been placed on the sheet feeding tray, the scanner program 58 enters a running mode.

The application program 26 controls the LCD 16 to display thereon an edit screen (not shown) and receives an input from the user via the input I/F 18. When the application program 26 receives on the edit screen an instruction for the scanner 50 to execute reading, the application program 26 controls the LCD 16 to display a settings screen (not shown) on the edit screen.

The settings screen is a screen for receiving various settings of the scanner 50. The settings screen includes a scan start button and a widget for receiving inputs of a delay period and a timeout period (lengths of the delay period and the timeout period). Note that the delay period and the timeout period may be set to a user's desired period of time by a user's input in the widget. Alternatively, each of the delay period and the timeout period may be a predetermined time period. The timeout period is an example of the claimed "first period of time" and is also an example of the claimed "specific period of time." The delay period is an example of the claimed "second period of time."

The delay period is a period of time from a time when a detection signal is inputted to the CPU 52 from the original document sensor 63 due to the fact that a set of one or more original documents has been placed on the sheet feeding tray to a time when the ADF 60 starts to be driven for a reading operation. With the delay period, after placing a set of one or more original documents on the sheet feeding tray, the user can align the one or more original documents, for example.

Upon determining that the scan start button in the settings screen has been selected, the application program 26 transmits to the scanner driver 28 an instruction to start a scanning operation (M1). In response to receiving the instruction, the scanner driver 28 begins the automatic and continuous scan sequence.

After starting the automatic and continuous scan sequence, the scanner driver 28 transmits to the scanner program 58 the values indicating the delay period and the timeout period inputted via the settings screen, and also transmits to the scanner program 58 an instruction to start an automatic and continuous scan (M2). The instruction to start an automatic and continuous scan is an example of the claimed "reading start instruction."

Figure 3:
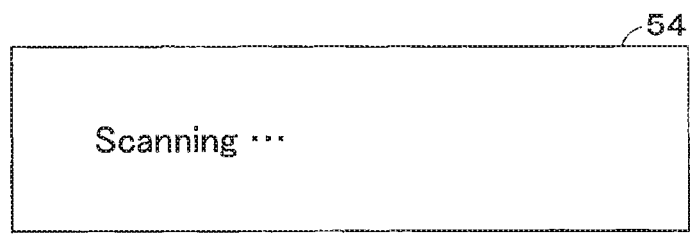
FIG. 3 is a view illustrating a screen displayed on an LCD of the scanner during a scan process executed by the scanner program of the scanner in the scan system according to the embodiment.

In response to receiving the instruction to start the automatic and continuous scan, the scanner program 58 executes a scan process. After starting the scan process, the scanner program 58 controls the LCD 54 to display thereon a message indicating that the scan process is being executed, such as a message "Scanning" as illustrated in FIG. 3.

Further, after starting the scan process, the scanner program 58 controls the ADF 60 to start to convey the first document set placed on the sheet feeding tray one by one, and also controls the image-reader 62 to start to read the first document set one by one. In this way, the ADF 60 starts conveying the first document set and the image-reader 62 starts reading the set of original documents. Note that, in this scan process, the image-reader 62 reads the one or more original documents in the first document set and generates one or more scan data sets indicating one or more images on the one or more original documents in the first document set.

Further, after the scan process on the first document set is started, each time a piece of line scan data is generated by the image-reader 62, the scanner program 58 stores the piece of line scan data in the data storage area 59 and controls the network I/F 51 to transmit the piece of line scan data stored in the data storage area 59 to the scanner driver 28. Note that a pieces of line scan data generated by the image-reader 62 has a data size not larger than a predetermined data size. In this way, the scanner program 58 controls the image-reader 62 and the network I/F 51 to execute generating and transmitting scan data sets in parallel, and multiple times of transmission are performed for each of the one or more generated scan data sets.

As described above, in the present embodiment, each time a piece of line scan data is generated and stored, the piece of line scan data is transmitted to the scanner driver 28. However, the method of transmitting scan data is not limited to this and any method may be used. For example, each time a plurality of pieces of line scan data is generated, the plurality of pieces of line scan data may be compressed and transmitted to the scanner driver 28. Alternatively, for example, each time one original document worth of scan data is generated, the scan data may be compressed and transmitted to the scanner driver 28.

When the scanner program 58 finishes reading all of the one or more original documents in the first document set and transmitting all of the plurality of pieces of generated line scan data, the scanner program 58 ends the scan process. Note that, in FIG. 2, the last transmission of scan data (M3) is illustrated but the transmissions of scan data performed prior to the last transmission are abbreviated.

The scanner program 58 starts a time-counting process from a time when the last transmission of scan data (M3) is completed. More specifically, the scanner program 58 starts the time-counting process at a predetermined time after completion of reading all of the one or more original documents in the first document set. Note that, in the present embodiment, the time when the last transmission of scan data (M3) is completed is used as the predetermined time and thus the time-counting process is started at the time when the last transmission of scan data (M3) is completed.

The time-counting process is a process of counting a remaining period of time until a timeout time. The timeout time is a time when the timeout period indicated by the value transmitted at M2 has elapsed from the predetermined time. The timeout time is an example of the claimed "specific time."

Note that the time-counting process may be started at any timing. For example, after the last transmission of scan data (M3), the time-counting process may be triggered by the scanner program 58 receiving from the scanner driver 28 a notification indicating completion of reception of all of the plurality of pieces of generated line scan data generated in the above-described scan process.

Each time receiving the piece of line scan data transmitted from the scanner program 58, the scanner driver 28 stores the piece of line scan data in the data storage area 34. Upon receiving the piece of line scan data transmitted by the last transmission, the scanner driver 28 converts the format of the plurality of pieces of line scan data stored in the data storage area 34 into a format suitable for the application program 26 and transmits the plurality of pieces of converted line scan data to the application program 26 (M4).

Figure 4:
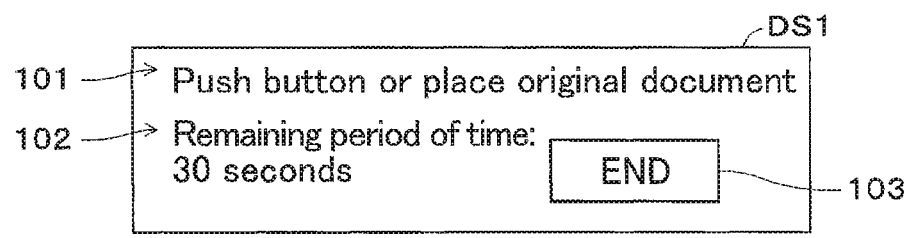
FIG. 4 is a view illustrating a standby dialog displayed on an LCD of the PC during an automatic and continuous scan sequence executed in the scan system according to the embodiment.

In the meantime, upon starting the time-counting process, the scanner program 58 transmits remaining-period information indicating the counted remaining period of time (M5) to the scanner driver 28. When receiving the remaining-period information (i.e., the remaining period of time), the scanner driver 28 controls the LCD 16 to display thereon a standby dialog DS1 as illustrated in FIG. 4.

On the standby dialog DS1, there are displayed a message 101 (such as "Push button or place original documents"), a message 102 (such as "Remaining period of time: 30 seconds") announcing the remaining period of time indicated by the received remaining-period information, and an end button 103. This standby dialog DS1 enables the user to recognize that, if the user wishes to scan an additional set of one or more original documents, the user can do so just by placing the additional document set on the sheet feeding tray within the remaining period of time displayed on the standby dialog DS1. Further, the standby dialog DS1 enables the user to recognize that, if the user wishes to end the automatic and continuous scan, the user has only to select the end button 103.

Figure 5:
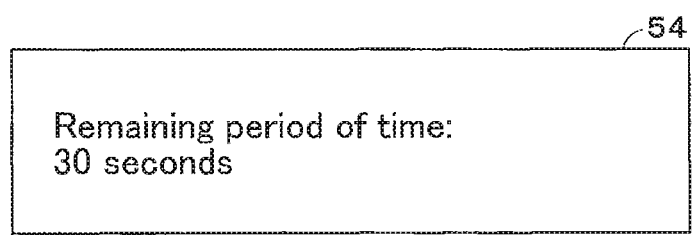
FIG. 5 is a view illustrating a screen displayed on the LCD of the scanner during a time-counting process executed by the scanner program of the scanner in the scan system according to the embodiment.

On the other hand, after starting the time-counting process, the scanner program 58 controls the LCD 54 to display thereon the remaining period of time, for example, using a message "Remaining period of time: 30 seconds," as illustrated in FIG. 5. By this configuration, the user who has instructed the automatic and continuous scan can be informed of the remaining period of time. Further, this configuration enables other users to recognize that the scanner 50 is being used.

Note that, when an operation to the input I/F 55 is performed while the scanner program 58 is executing the time-counting process, the scanner program 58 continues the time-counting process without executing a process corresponding to the operation performed to the input I/F 55.

For example, in a case where the input I/F 55 includes a scan start button, even when another user presses the scan start button (i.e., even when the scanner program 58 receives via the input I/F 55 a new instruction to start an scanning operation) while the scanner program 58 is executing the time-counting process, the scanner program 58 continues the time-counting process. The new instruction to start an scanning operation is an example of the claimed "another reading start instruction."

Further, for example, also when an instruction to start a new scan process is transmitted from a PC (not shown) to the scanner program 58 via the network 40 while the scanner program 58 is executing the time-counting process, the scanner program 58 transmits to the PC a message indicating that the instruction to start the new scan process cannot be accepted and continues the time-counting process without accepting the instruction. By this configuration, termination of the automatic and continuous scan against the intention of the user who has instructed the automatic and continuous scan can be prevented.

When a predetermined period of time (for example, 10 seconds) has elapsed from the transmission of the remaining-period information is performed at M5, the scanner program 58 transmits, to the scanner driver 28, remaining-period information indicating the remaining period of time counted and updated through the time-counting process (M6) and controls the LCD 54 to update the remaining period of time displayed thereon. Upon receiving the remaining-period information transmitted at M6, the scanner driver 28 updates the remaining period of time included in the message 102 in the standby dialog DS1.

If the user wishes to have the scanner 50 continuously perform a scan process on an additional set of one or more original documents, the user places the additional set of one or more original documents on the sheet feeding tray before the timeout time, i.e., before the timeout period indicated by the value transmitted at M2 has elapsed from the predetermined time (i.e., the time when the last transmission of scan data (M3) is completed).

When the user places an additional set of original documents on the sheet feeding tray before the timeout time and the original document sensor 63 outputs a detection signal to the scanner program 58, the scanner program 58 determines that a set of one or more original documents has been placed on the sheet feeding tray before the timeout time and thus terminates the time-counting process. Note that, hereinafter, the additional set of one or more original documents placed on the sheet feeding tray will be also referred to as "second document set" and the scan process performed on the additional set of one or more original documents will be also referred to as "additional scan process."

Then, the scanner program 58 starts an additional scan process at a time when the delay period indicated by the value transmitted in M2 has elapsed from the time when the scanner program 58 receives the detection signal.

In the additional scan process, similarly to the scan process performed prior thereto, the scanner program 58 controls the image-reader 62 to read the one or more original document in the second document set and generate one or more scan data sets indicating one or more images on the one or more original documents in the second document set, and performs multiple times of transmission of scan data to transmit the one or more generated scan data sets to the scanner driver 28. After performing the last transmission of scan data (M8), the scanner program 58 terminates the additional scan process and starts again the time-counting process.

On the other hand, the scanner driver 28 closes the standby dialog DS1 in response to receiving a piece of line scan data transmitted by the first transmission (M7). Then, in response to receiving a piece of line scan data transmitted by the last transmission (M8), similarly in M4, the scanner driver 28 transmits to the application program 26 the one or more scan data sets transmitted in the additional scan process form the scanner program 58.

In the meantime, after starting the time-counting process, the scanner program 58 transmits remaining-period information indicating a counted remaining period of time to the scanner driver 28 in M10, similarly in M5. Upon receiving the remaining-period information transmitted in M10, the scanner driver 28 controls the LCD16 to display the standby dialog DS1 as described above. The subsequent steps in this sequence are the same as those described above. That is, the scanner program 58 transmits the remaining-period information at predetermined time intervals and performs a scan process when a set of one or more original documents is placed before the timeout time.

<Termination of Sequence by Pressing Stop Button>

Next, descriptions will be made to a case where the user presses the stop button 55A of the scanner 50 during the automatic and continuous scan sequence in order to terminate the automatic and continuous scan.

When the scanner program 58 determines, before the timeout time (i.e., before the timeout period has elapsed from the predetermined time), that a termination signal has been inputted in response to the stop button 55A being pressed, the scanner program 58 terminates the time-counting process and transmits an End message to the scanner driver 28 (M11). Upon receiving the End message, the scanner driver 28 closes the standby dialog DS1, and transmits a Close message to the scanner program 58 (M12). The End message transmitted at M11 is an example of the claimed "termination information" and is also an example of the claimed "termination instruction."

When the scanner program 58 in the running mode receives the Close message, the scanner program 58 enters the standby mode. On the other hand, after transmitting the Close message, the scanner driver 28 transmits a completion message to the application program 26 (M13) and terminates the automatic and continuous scan sequence.

Note that, also when the remaining period of time determined through the time-counting process reaches zero (i.e., also when the timeout period has elapsed from the predetermined time), the scanner program 58 terminates the time-counting process and transmits an End message to the scanner driver 28. The subsequent steps of the sequence are the same as those described above.

<Termination of Sequence by Selecting End Button in Standby Dialog>

Next, a case where the user selects the end button 103 on the standby dialog DS1 during the automatic and continuous scan sequence in order to terminate the automatic and continuous scan will be described while referring to FIG. 6.

Figure 6:
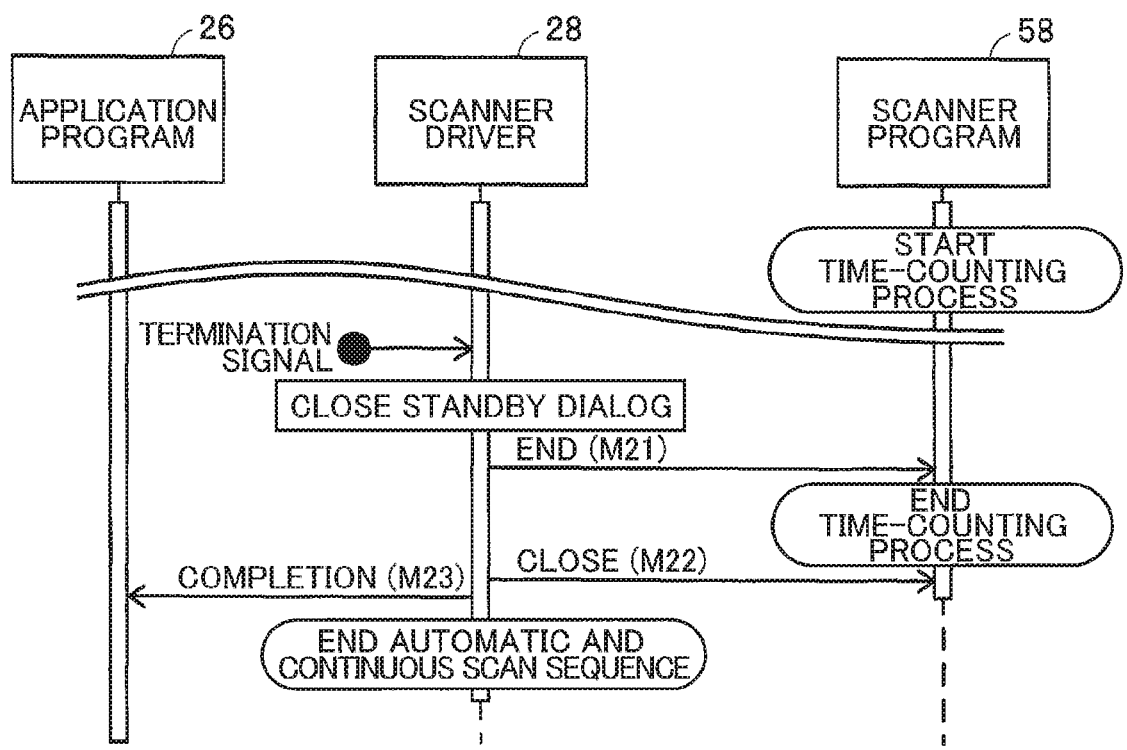
FIG. 6 is a sequence diagram illustrating the automatic and continuous scan sequence in a case where an end button on the standby dialog is selected during the time-counting process executed by the scanner program of the scanner in the scan system according to the embodiment.

FIG. 6 illustrates a case where, during the automatic and continuous scan sequence, the end button 103 is selected on the standby dialog DS1 while the scanner program 58 is executing a time-counting process to count the remaining period of time.

When the end button 103 is selected, the scanner driver 28 determines that a termination signal has been inputted to the scanner driver 28. Upon determining that the termination signal has been inputted (i.e., upon receiving the termination signal), the scanner driver 28 closes the standby dialog DS1 and transmits an End message to the scanner program 58 (M21). The termination signal is an example of the claimed "termination instruction."

In response to receiving the End message during a time-counting process, the scanner program 58 terminates the time-counting process. On the other hand, after transmitting the End message, the scanner driver 28 transmits a Close message to the scanner program 58 (M22).

When the scanner program 58 in the running mode receives the Close message, the scanner program 58 enters the standby mode. On the other hand, after transmitting the Close message, the scanner driver 28 transmits a completion message to the application program 26 (M23) and ends the automatic and continuous scan sequence.

<Sequence in Case of Error Occurrence During Time-Counting Process>

Next, a case where an error has occurred during a time-counting process performed by the scanner 50 in the automatic and continuous scan sequence, e.g., a case where the casing cover of the scanner 50 has been opened during a time-counting process in the automatic and continuous scan sequence will be described with reference to FIG. 7. Note that the casing cover of the scanner 50 is provided with an open/close sensor (now shown) configured to output an error signal to the CPU 52 in response to the casing cover being opened.

When an error signal has been inputted to the scanner program 58 during a time-counting process, the scanner program 58 determines that an error has occurred, interrupts the time-counting process, and controls the LCD 54 to display an error screen (not shown) including a message such as "Please eliminate this error." When the input of the error signal is stopped in response to the casing cover being closed, the scanner program 58 determines that the error has been eliminated and resumes the time-counting process.

Note that, within a period of time from a time when the time-counting process is interrupted to a time when the time-counting is resumed, the scanner driver 28 continues to display the standby dialog DS1 without updating the remaining period of time thereon since the scanner program 58 cannot transmit the remaining-period information indicating the remaining period of time to the scanner driver 28. The subsequent steps are the same as those described above and thus descriptions to the subsequent steps will be omitted. Similarly to FIG. 2, FIG. 7 illustrates the steps for a case where the automatic and continuous scan sequence is terminated due to the fact that the stop button 55A of the scanner 50 is pressed.

<Sequence in Case of Communication Error Occurrence During Time-Counting Process>

Figure 8:
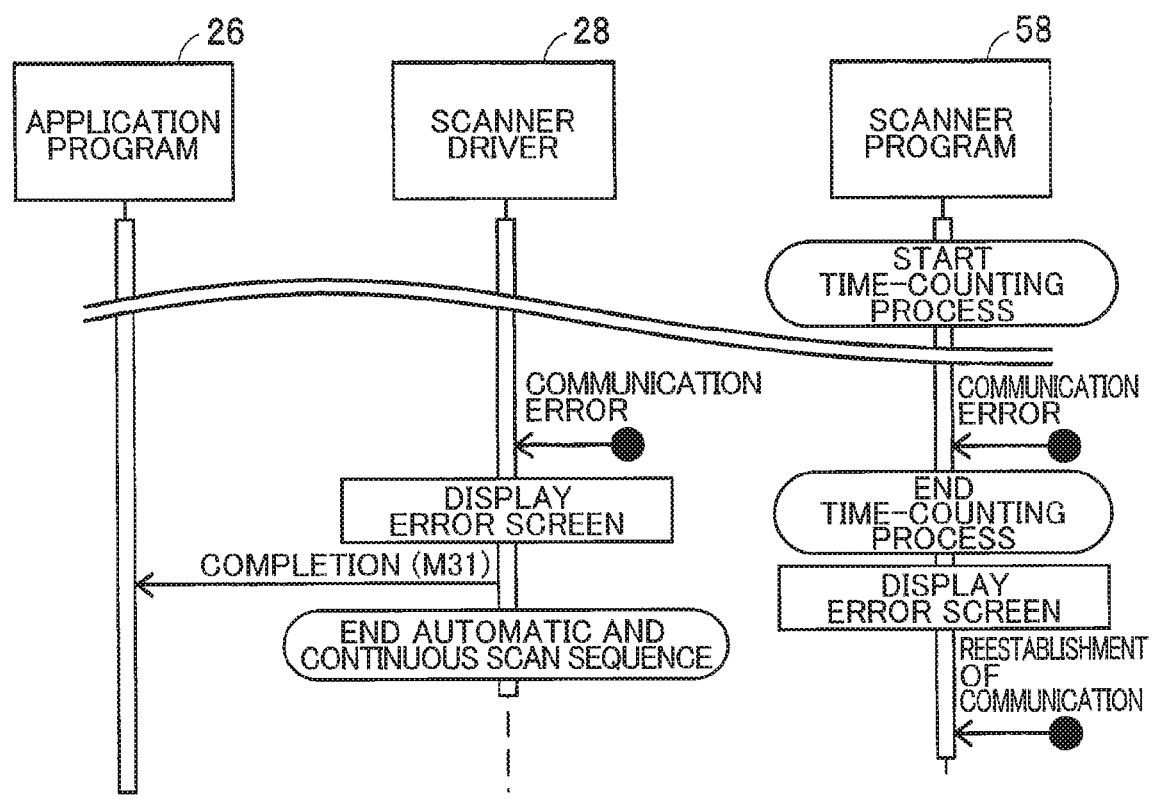
FIG. 8 is a sequence diagram illustrating the automatic and continuous scan sequence in a case where a communication error has occurred during the time-counting process executed by the scanner program of the scanner in the scan system according to the embodiment.

Next, a case where a communication error has occurred due to disconnection of communication between the scanner 50 and the PC 10 through the network 40 during a time-counting process performed by the scanner 50 in the automatic and continuous scan sequence will be described with reference to FIG. 8.

When, during a time-counting process, the scanner program 58 receives from the network I/F 51 a notification of a communication error caused by, for example, disconnection of communication between the scanner 50 and the PC 10, the scanner program 58 terminates the time-counting process and controls the LCD 54 to display thereon an error screen (not shown) including a message such as "Connection Error."

After then, when the scanner program 58 determines, on the basis of a message from the network I/F 51, that the communication via the network 40 is reestablished, the scanner program 58 in the running mode enters the standby mode.

On the other hand, when receiving a notification of a communication error from the network I/F 20, the scanner driver 28 controls the LCD 16 to display thereon an error screen (not shown) including a message such as "Connection Error," transmits a completion message to the application program 26 (M31), and terminates the automatic and continuous scan sequence.

In this way, the processes being executed are terminated in a case where a communication error has occurred. This is because reestablishment of the communication is uncertain once a communication error has occurred.

<Sequence in Case of Error Occurrence During Scan Process>

Next, a case where an error has occurred during a scan process performed by the scanner 50 in the automatic and continuous scan sequence, e.g., a case where the casing cover of the scanner 50 has been opened during a scan process in the automatic and continuous scan sequence will be described with reference to FIG. 9.

When an error signal has been inputted, the scanner program 58 transmits a notification of an error occurrence to the scanner driver 28 (M41) and ends the scan process. The scanner program 58 then controls the LCD 54 to display thereon an error screen including a message such as "Please eliminate this error."

On the other hand, in response to receiving the notification of the error occurrence at M41, the scanner driver 28 discards the scan data sets stored in the data storage area 34.

After then, when the input of the error signal has been stopped in response to the casing cover being closed, the scanner program 58 determines that the error has been eliminated, starts the time-counting process, and transmits remaining-period information to the scanner driver 28 (M42).

Upon receiving the remaining-period information, the scanner driver 28 controls the LCD 16 to display thereon the standby dialog DS1. The subsequent steps are the same as those illustrated in FIG. 2. In specific, after determining, on the basis of a detection signal from the original document sensor 63, that a set of one or more original documents has been placed on the sheet feeding tray before the timeout time, the scanner program 58 ends the time-counting process and performs a scan process on the set of one or more original document.

<Termination of Sequence by Selecting of End Button on Standby Dialog During Scan Process>

Next, a case where the user selects, in order to terminate the automatic and continuous scan, the end button 103 on the standby dialog DS1 during a scan process (e.g., after a set of one or more original documents is placed on the sheet feeding tray) in the automatic and continuous scan sequence will be described with reference to FIG. 10.

Note that, as described above, when the scanner program 58 determines that a set of one or more original documents has been placed on the sheet feeding tray during a time-counting process, the scanner program 58 ends the time-counting process and then starts a scan process on the original document set. However, as illustrated in FIG. 2, even after the scanner program 58 terminates the time-counting process and starts the scan process, the scanner driver 28 continues to display the standby dialog DS1 until receiving a piece of line scan data transmitted by the first transmission (M7) (i.e., until closing the standby dialog DS1 in response to the first transmission of scan data). Accordingly, even after the time-counting process is terminated and the scan process is started, the user can press and select the end button 103 on the standby dialog DS1 until the scanner driver 28 closes the standby dialog DS1 in response to the first transmission of scan data. That is, the following description is for a case where the user selects the end button 103 on the standby dialog DS1 within a period of time from a time when a scan process is started to a time when the standby dialog DS1 is closed.

FIG. 10 illustrates steps in the automatic and continuous sequence after a time when the scanner program 58 starts the scan process in response to an instruction to perform the automatic and continuous scan from the scanner driver 28.

Upon starting a scan process, the scanner program 58 performs the first transmission of scan data to the scanner driver 28 (M51). Then, after the scanner program 58 performs the last transmission of scan data to the scanner driver 28 (M52), the scanner program 58 terminates the scan process and starts a time-counting process.

On the other hand, when the scanner driver 28 receives a piece of line scan data transmitted by the last transmission (M52), the scanner driver 28 converts the plurality of pieces of line scan data transmitted in the scan process and transmits the plurality of pieces of converted line scan data to the application program 26 (M53).

In the meantime, after starting the time-counting process, the scanner program 58 transmits remaining-period information to the scanner driver 28 (M54). In response to receiving the remaining-period information, the scanner driver 28 controls the LCD 16 to display thereon the standby dialog DS1. When the scanner program 58 determines before timeout time, on the basis of a detection signal from the original document sensor 63, that a set of one or more original document has been placed on the sheet feeding tray, the scanner program 58 terminates the time-counting process. Then, after the delay period elapses, the scanner program 58 starts a scan process on the set of one or more original documents additionally placed on the sheet feeding tray.

Here, it will be assumed that the user selects the end button 103 in the standby dialog DS1. When the end button 103 is selected during the scan process, the scanner driver 28 determines that a termination signal has been inputted. In response to determining that a termination signal has been inputted, the scanner driver 28 closes the standby dialog DS1 and transmits an End message to the scanner program 58 (M55). Upon receiving the End message, the scanner program 58 ends the scan process and deletes the scan data sets stored in the data storage area 59 (FIG. 10). The End message transmitted at M55 is an example of the claimed "reading termination instruction."

Note that, in a case where the scanner program 58 performs a transmission of scan data to the scanner driver 28 at the same time as a time when the scanner driver 28 transmits the End message, the scanner driver 28 discards the received piece of line scan data without storing the same in the data storage area 34.

On the other hand, after transmitting the End message, the scanner driver 28 transmits a Close message to the scanner program 58 (M56). When the scanner program 58 in the running mode receives the Close message, the scanner program 58 enters the standby mode. After transmitting the Close message, the scanner driver 28 transmits a completion message to the application program 26 (M57) and ends the automatic and continuous scan sequence.

<Technical Advantages>

The following technical advantages are brought by the embodiment described above.

As described with reference to FIG. 2, the application program 26 can treat, as one group of data, a plurality of scan data sets that are transmitted from the scanner driver 28 within a period of time from a time when the application program 26 instructs a scanning operation (M1) to a time when the application program 26 receives a completion message (M13). That is, according to the present embodiment, in the above configuration that the PC 10 instructs the scanner 50 to execute a reading operation, a plurality of scan data sets generated through multiple times of reading processes executed by the scanner 50 can be treated as one group of data.

According to the above-described embodiment, when the scanner driver 28 receives from the application program 26 an instruction to start a scanning operation (M1), the scanner driver 28 instructs the scanner program 58 to start the automatic and continuous scan (M2). Upon receiving the instruction to start the automatic and continuous scan (M2), the scanner 50 executes a scan process on a preceding set of one or more original documents. Then, when the scanner 50 detects, before the timeout time (i.e., before the timeout period elapses from the predetermined time after completion of reading all of the one or more original documents in the preceding set), that a subsequent set of one or more original documents has been placed on the sheet feeding tray, the scanner 50 continuously executes a scan process on the subsequent set of one or more original documents following the scan process on the preceding set of one or more original documents.

Further, when the scanner driver 28 receives from the scanner program 58 the remaining-period information indicating the remaining period of time (M5), the scanner driver 28 displays the standby dialog DS1. Further, when the scanner driver 28 receives the End massage from the scanner program 58 (M10), the scanner driver 28 transmits a completion message to the application program 26 (M12) and then terminates the automatic and continuous scan sequence.

Figure 2:
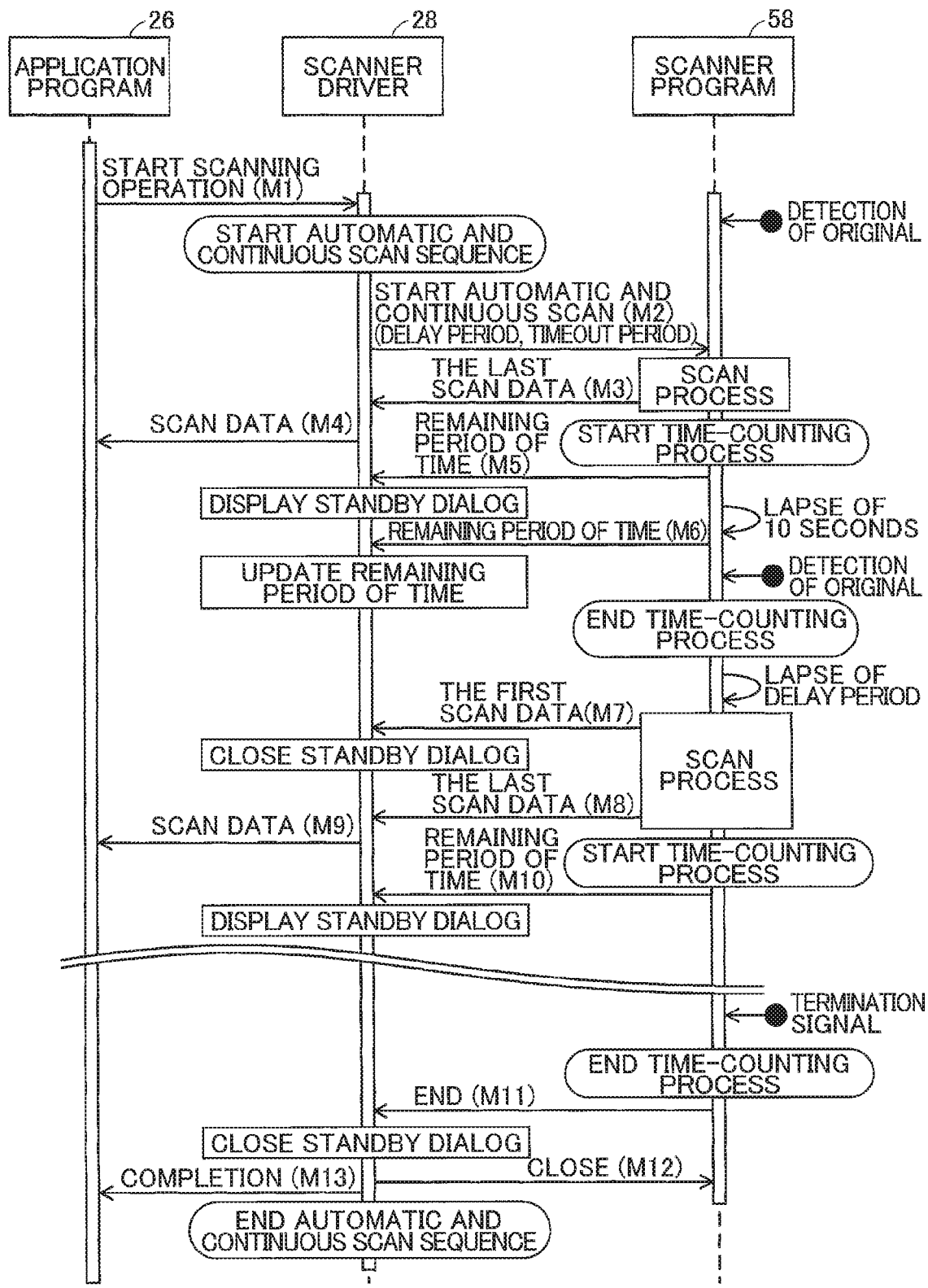
FIG. 2 is a sequence diagram illustrating an automatic and continuous scan sequence executed by a scanner driver of a PC and a scanner program of a scanner in the scan system according to the embodiment.

Further, at M2 the scanner program 58 receives the timeout period (FIG. 2). By this configuration, the scanner 50 can execute the time-counting process on the basis of the timeout period transmitted from the PC 10.

Further, the scanner program 58 starts a scan process at a time when the delay period elapses from a time when the scanner program 58 receives a detection signal from the original document sensor 63 (FIG. 2). By this configuration, the scanner 50 can perform the scan process after the delay period transmitted from the PC 10 elapses.

Further, the scanner program 58 interrupts the time-counting process when detecting an error signal, and resumes the time-counting process when the error signal is cleared (FIG. 9). This enables the scanner program 58 to resume the time-counting process after elimination of the error.

Figure 7:
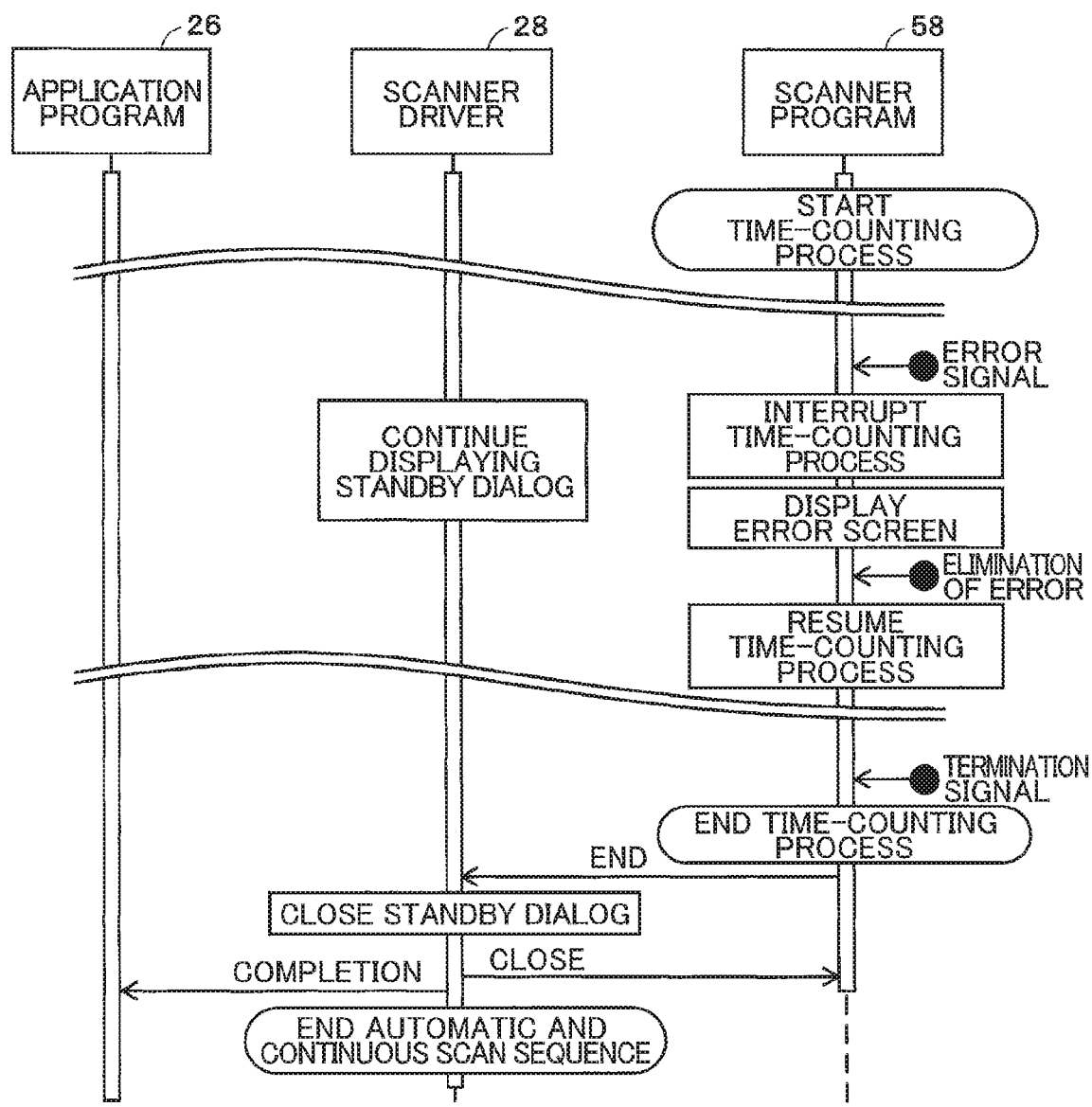
FIG. 7 is a sequence diagram illustrating the automatic and continuous scan sequence in a case where an error has occurred during the time-counting process executed by the scanner program of the scanner in the scan system according to the embodiment.

Further, when the scanner program 58 detects during the time-counting process that the communication with the PC 10 has been disconnected, the scanner program 58 ends the time-counting process (FIG. 7). Further, when the scanner driver 28 detects during the automatic and continuous scan sequence that the communication with the scanner 50 has been disconnected, the scanner driver 28 ends the automatic and continuous scan sequence (FIG. 7). By these configurations, the scanner program 58 and the scanner driver 28 can avoid unnecessary processes by terminating the time-counting process and the automatic and continuous scan sequence, respectively, when reestablishment of the communication is uncertain due to the fact that the communication is disconnected.

When the scanner program 58 receives an End message during a scan process and before the first transmission of scan data is performed by the scanner program 58 (M55), the scanner program 58 ends the scan process and deletes one or more scan data sets stored in the data storage area 59 (FIG. 10). In this way, the user can terminate the automatic and continuous scan by performing an operation to the PC 10.

Further, during the time-counting process, the scanner program 58 continues the time-counting process even when the scanner program 58 receives during a new instruction to start a scanning operation. In this way, the scanner program 58 can continue the time-counting process even if a user other than the user who has instructed the automatic and continuous scan operates the input I/F 55.

When the scanner program 58 receives a termination signal during the time-counting process, the scanner program 58 transmits an End message to the PC 10 (M11) and ends the time-counting process (FIG. 2). In this way, the user can operate the scanner 50 to end the automatic and continuous scan.

While the description has been made in detail with reference to the above embodiment, it would be apparent to those skilled in the art that many modifications and variations may be made thereto. For example, although the time when the last transmission of scan data (M3) is completed is employed as the predetermined time in the above embodiment, the predetermined time may be any timing provided that a time after completion of all reading operations in a scan process. For example, in a case where the scanner driver 28 employs a configuration that transmits, in response to receiving a piece of line scan data transmitted by the last transmission, a notification of receipt of the piece of line scan data to the scanner program 58, the time-counting process may be started after the scanner program 58 receives the notification.

Although the detection signal outputted from the original document sensor 63 has been described as an example of the claimed "specific signal," the latter is not limited to the detection signal. For example, in a case where a configuration in which a scan start button is displayed on the standby dialog DS1 is employed, the claimed "specific signal" may be a signal outputted in response to selection of the scan start button. Further, an error may be any incident besides opening of the casing cover. For example, the error may be jamming of an original document in the scanner 50.

Further, although the scanner 50 has been described as an example of the claimed "image-reading apparatus," the latter is not limited to the scanner 50. For example, the claimed "image-reading apparatus" may be a multifunction peripheral having a plurality of functions such as a scan function, a printer function, and other functions.

What is claimed is:
1. An image-reading apparatus comprising:
an image-reader configured to read an original document and to generate a read data set indicating an image on the original document;

a communication interface enabling the image-reading apparatus to communicate with an information-processing apparatus; and a controller configured to perform:
(a) controlling, in response to receiving a reading start instruction from the information-processing apparatus via the communication interface, the image-reader to execute:
  (a1) reading a first set of one or more original documents; and
  (a2) generating one or more read data sets indicating one or more images on the one or more original documents in the first set;
(b) transmitting, to the information-processing apparatus via the communication interface, the one or more read data sets generated by the (a2) generating;
(c) counting a remaining period of time until a specific time, the specific time being a time when a first period of time elapses from a predetermined time after completion of the (a1) reading;
(d) transmitting, to the information-processing apparatus via the communication interface, information indicating the counted remaining period of time;
(e) controlling, in response to receiving a specific signal before the specific time, the image-reader to execute:
  (e1) reading a second set of one or more original documents; and
  (e2) generating one or more read data sets indicating one or more images on the one or more original documents in the second set; and
(f) transmitting, to the information-processing apparatus via the communication interface, the one or more read data sets generated by the (e2) generating.

2. The image-reading apparatus according to claim 1, wherein the controller is configured to further perform:
(g) receiving, from the information-processing apparatus via the communication interface, information indicating the first period of time.

3. The image-reading apparatus according to claim 1, further comprising a sensor, the sensor being configured to output the specific signal in response to detecting that the second set of one or more original documents has been placed,
wherein the controller is configured to further perform:
(h) receiving, from the information-processing apparatus via the communication interface, information indicating a second period of time, and
wherein, at a time when the second period of time elapses from a time when receiving the specific signal, the controller starts to perform the (e) controlling.

4. The image-reading apparatus according to claim 1, wherein the controller is configured to further perform:
(i) interrupting the (c) counting in response to detecting that an error has occurred while performing the (c) counting; and
(j) resuming the (c) counting in response to detecting that the error has been eliminated.

5. The image-reading apparatus according to claim 1, wherein the controller is configured to further perform:
(k) terminating the (c) counting in response to detecting that communication between with the information-processing apparatus has been disconnected while performing the (c) counting.

6. The image-reading apparatus according to claim 1, further comprising a memory,
wherein the controller is configured to further perform:
(l) storing, in the memory, the one or more read data sets generated by the (e2) generating, and
wherein the (f) transmitting transmits, to the information-processing apparatus via the communication interface, the one or more read data sets stored in the memory by the (l) storing.

7. The image-reading apparatus according to claim 6, wherein the controller is configured to further perform, in response to receiving a reading termination instruction from the information-processing apparatus via the communication interface while performing the (e) controlling and before performing the (f) transmitting:
(m) terminating the (e) controlling; and
(n) deleting, from the memory, the one or more read data sets stored by the (l) storing.

8. The image-reading apparatus according to claim 1, further comprising an input interface,
wherein, even when receiving another reading start instruction via the input interface while performing the (c) counting, the controller continues the (c) counting.

9. The image-reading apparatus according to claim 1, further comprising an input interface,
wherein the controller is configured to further perform, in response to receiving a reading termination instruction via the input interface while performing the (c) counting:
terminating the (c) counting; and
transmitting a termination information to the information-processing apparatus via the communication interface.

10. A non-transitory computer-readable storage medium storing a set of program instructions for an information-processing apparatus,
the information-processing apparatus comprising:
a communication interface enabling the information-processing apparatus to communicate with an image-reading apparatus;
a display; and
a processor,
the set of program instructions, when executed by the processor, causing the information-processing apparatus to perform a reading sequence comprising:
(a) transmitting, after starting to perform the reading sequence, a reading start instruction to the image-reading apparatus via the communication interface, the image-reading apparatus being configured to perform, in response to receiving the reading start instruction:
  (i1) reading a first set of one or more original documents; and
  (i2) generating one or more read data sets indicating one or more images on the one or more original documents in the first set;
(b) receiving, from the image-reading apparatus via the communication interface, the one or more read data sets generated by the (i2) generating;
(c) receiving, from the image-reading apparatus via the communication interface, information indicating a remaining period of time until a specific time, the specific time being a time when a specific period of time elapses from a predetermined time after completion of the (i1) reading, the image-reading apparatus being configured to further perform, in response to receiving a specific signal before the specific time:

(i3) reading a second set of one or more original documents; and (i4) generating one or more read data sets indicating one or more images on the one or more original documents in the second set;

(d) displaying, on the display, the remaining period of time indicated by the information received in the (c) receiving;

(e) receiving, from the image-reading apparatus via the communication interface, one or more read data sets generated by the (i4) generating;

(f) terminating the reading sequence in response to the specific period of time elapsing from the predetermined time without the information-processing apparatus performing the (e) receiving; and (g) terminating the reading sequence in response to receiving a termination instruction before the specific time.

11. The non-transitory computer-readable storage medium according to claim 10, wherein the reading sequence further comprises:

(h) terminating the reading sequence in response to detecting that communication with the image-reading apparatus has been disconnected after starting to perform the reading sequence.

12. A reading system comprising an image-reading apparatus and an information-processing apparatus, the image-reading apparatus comprising:
an image-reader configured to read an original document and to generate a read data set indicating an image on the original document;
a first communication interface enabling the image-reading apparatus to communicate with the information-processing apparatus; and
a first controller configured to perform:
(a) controlling, in response to receiving a reading start instruction from the information-processing apparatus via the first communication interface, the image-reader to execute:
(a1) reading a first set of one or more original documents; and
(a2) generating one or more read data sets indicating one or more images on the one or more original documents in the first set;
(b) transmitting, to the information-processing apparatus via the first communication interface, the one or more read data sets generated by the (a2) generating;
(c) counting a remaining period of time until a specific time, the specific time being a time when a specific period of time elapses from a predetermined time after completion of the (a1) reading;
(d) transmitting, to the information-processing apparatus via the first communication interface, information indicating the counted remaining period of time;
(e) controlling, in response to receiving a specific signal before the specific time, the image-reader to execute:
(e1) reading a second set of one or more original documents; and
(e2) generating one or more read data sets indicating one or more images on the one or more original documents in the second set; and
(f) transmitting, to the information-processing apparatus via the first communication interface, the one or more read data sets generated by the (e2) generating, the information-processing apparatus comprising:
a display;
a second communication interface enabling the information-processing apparatus to communicate with an image-reading apparatus; and
a second controller configured to perform a reading sequence comprising:
(g) transmitting, after starting to perform the reading sequence, the reading start instruction to the image-reading apparatus via the second communication interface;
(h) receiving, from the image-reading apparatus via the second communication interface, the one or more read data sets generated by the (a2) generating;
(i) receiving, from the image-reading apparatus via the second communication interface, the information transmitted by the (d) transmitting;
(j) displaying, on the display, the remaining period of time indicated by the information received in the (i) receiving;
(k) receiving, from the image-reading apparatus via the second communication interface, the one or more read data sets generated by the (e2) generating;
(l) terminating the reading sequence in response to the specific period of time elapsing from the predetermined time without the second controller performing the (k) receiving; and
(m) terminating the reading sequence in response to receiving a termination instruction before the specific time.

\* \* \* \* \*